United States Patent
Lindgren et al.

(10) Patent No.: US 6,185,425 B1
(45) Date of Patent: Feb. 6, 2001

(54) CALL ROUTING USING DIRECT IN-DIALING NUMBERS IN PLACE OF TEMPORARY ROUTING NUMBERS

(75) Inventors: Magnus Lindgren; Claes Wikström, both of Linköping (SE)

(73) Assignee: Telefonaktiebolaget LM Ericsson, Stockholm (SE)

( * ) Notice: Under 35 U.S.C. 154(b), the term of this patent shall be extended for 0 days.

(21) Appl. No.: 09/102,722

(22) Filed: Jun. 22, 1998

(51) Int. Cl.[7] ..................................................... H04Q 7/20
(52) U.S. Cl. ........................... 455/445; 455/555; 455/426
(58) Field of Search ..................................... 455/433, 422, 455/445, 426, 461, 465, 555, 552

(56) References Cited

U.S. PATENT DOCUMENTS

| | | | |
|---|---|---|---|
| 5,353,340 | * 10/1994 | Kunz ..................... | 455/432 |
| 5,544,227 | * 8/1996 | Blust et al. ............. | 455/426 |
| 5,594,781 | * 1/1997 | Kozdon et al. ......... | 455/442 |
| 5,675,629 | * 10/1997 | Raffel et al. ........... | 455/552 |
| 5,699,407 | * 12/1997 | Nguyen ................... | 455/462 |
| 5,787,355 | * 7/1998 | Bannister et al. ....... | 455/458 |
| 5,854,982 | * 12/1998 | Chambers et al. ....... | 455/445 |
| 5,890,064 | * 3/1999 | Widergen et al. ....... | 455/445 |
| 5,890,069 | * 3/1999 | Evans et al. ............. | 455/462 |
| 5,926,760 | * 7/1999 | Khan et al. .............. | 455/435 |
| 5,995,843 | * 11/1999 | Sjodin et al. ............ | 455/462 |
| 6,014,560 | * 1/2000 | Kramer .................... | 455/414 |

FOREIGN PATENT DOCUMENTS

| | | | |
|---|---|---|---|
| 196 20 035 | 11/1997 | (DE) | H04Q/7/20 |
| 9213428 | 8/1992 | (WO) | H04Q/7/04 |
| 9421090 | 9/1994 | (WO) | H04Q/7/00 |
| 9501073 | 1/1995 | (WO) | H04Q/7/38 |
| 9742785 | 11/1997 | (WO) | H04Q/7/38 |

* cited by examiner

Primary Examiner—Dwayne D. Bost
Assistant Examiner—Joy K. Redman
(74) Attorney, Agent, or Firm—Jenkens & Gilchrist, A Professional Corporation

(57) ABSTRACT

A call routing number for a mobile station operating in a wireless telecommunication system is obtained by first requesting a temporary routing number for use in routing a call to the mobile station. Provided in response to the request is a routing number that had already been assigned to the mobile station when the request was received.

24 Claims, 5 Drawing Sheets

CALL ROUTING USING DIRECT IN-DIALING NUMBERS IN PLACE OF TEMPORARY ROUTING NUMBERS

FIELD OF THE INVENTION

The invention relates generally to setup and routing of calls in a wireless telecommunications system and, more particularly, to management of temporary routing numbers used to route calls.

BACKGROUND OF THE INVENTION

FIG. 1 illustrates a known wireless telecommunications system wherein a public switched telephone network PSTN, a public land mobile network PLMN (e.g., AMPS, GSM, PDC) and a private wireless (e.g, cellular) network are interfaced with one another. A Gateway mobile switching center GMSC of the PLMN is coupled to the PSTN for communication therewith, and is also coupled to a home location register HLR of the PLMN. The PSTN is coupled for communication with the private network, as is the HLR of the PLMN.

The private network includes a so-called Wireless Office System WOS which is coupled to the HLR. The WOS provides a mobile extension of the wired communication systems used in office environments. Typical workspaces which can benefit from WOS technology include corporate campuses, health care facilities, manufacturing facilities, hotel chains, retail stores, etc. The WOS interfaces with HLR during call setup in the same manner as would a conventional mobile switching center (MSC).

A local exchange LE of the PSTN communicates with the WOS via a private branch exchange PBX in the private network. In some systems, the functionality of the private branch exchange PBX is included in the WOS, so the local exchange LE of the PSTN communicates directly with the WOS, as indicated diagrammatically by the broken line connection in FIG. 1. FIG. 1 shows mobile stations (mobile subscriber units) MS1 and MS2 registered and operating in the WOS. The WOS provides basic wireless telephone services in addition to the PBX services offered by private networks. The WOS does not generally provide its services to PLMN subscribers roaming in the WOS coverage area.

The communications between the HLR and the GMSC at 12, and between the HLR and the WOS at 14 can be carried out, for example, using the IS-41 protocol of the D-AMPS standard, or the MAP protocol used in GSM systems. The communications links at 16, 17 and 18 in the PSTN can be, for example, R2 or ISDN based.

Referring now also to FIG. 2, when a call to a mobile station registered in the WOS is received at 21 in the GMSC, a location request is sent at 23 from the GMSC to the HLR. The HLR then makes a routing request at 25 to the WOS to obtain therefrom a temporary routing number at 27, which the HLR relays back to the GMSC at 29.

In the setup request 21 received in the GMSC, a mobile directory number MDN (i.e., the published directory number) associated with the called mobile station is included, and the GMSC relays this mobile directory number MDN in the location request 23 to the HLR. The HLR translates the MDN to a mobile identification number MIN (each mobile station has a unique MIN conventionally coded therein), and then includes this mobile identification number MIN in the routing request 25 to the WOS. The WOS then responds just like a conventional visited MSC (VMSC), namely, it assigns a temporary local directory number TLDN to be used in routing the call. The WOS sends the TLDN to the HLR at 27 (just as a conventional VMSC would), and HLR relays the TLDN to the GMSC at 29. This sequence is well known in the art.

Then, as shown in FIG. 3, the GMSC uses the TLDN to route the call through the PSTN and access the WOS from the nearest local exchange LE. The Transit block illustrated in FIG. 1 and also designated in FIG. 3 represents a conventional routing path from GMSC through PSTN to the local exchange LE nearest the WOS. The routing path represented by the Transit block can include, for example, a plurality of conventional exchanges or switches in the PSTN.

FIG. 4 illustrates a routing handler 41 in the WOS of FIG. 1 (or in a conventional VMSC). The routing handler receives the mobile identification number MIN from HLR, and provides to HLR the temporary local directory number TLDN from a pool of TLDNs allocated to the WOS by the PSTN operator. The TLDNs are part of the public number series issued by the PSTN operator. Thus, if the WOS requires additional TLDNs due, for example, to heavy traffic conditions, such new TLDNs must disadvantageously be issued by the local PSTN operator. Also, the TLDNs are typically allocated for only a short period of time (e.g., 30 seconds) so that, if the GMSC does not use the allocated TLDN to route a particular call, (e.g., caller hangs up), the TLDN will be freed for use in other calls. This feature minimizes the size of the TLDN pool that is required, but disadvantageously requires the routing handler 41 to implement a timer/time-out function.

According to the present invention, a private network such as (or including) a WOS provides to the PLMN direct in-dialing numbers in place of temporary routing numbers, and thus advantageously requires significantly less resources to manage temporary routing numbers than does the prior art arrangement.

DETAILED DESCRIPTION

Figure 1:
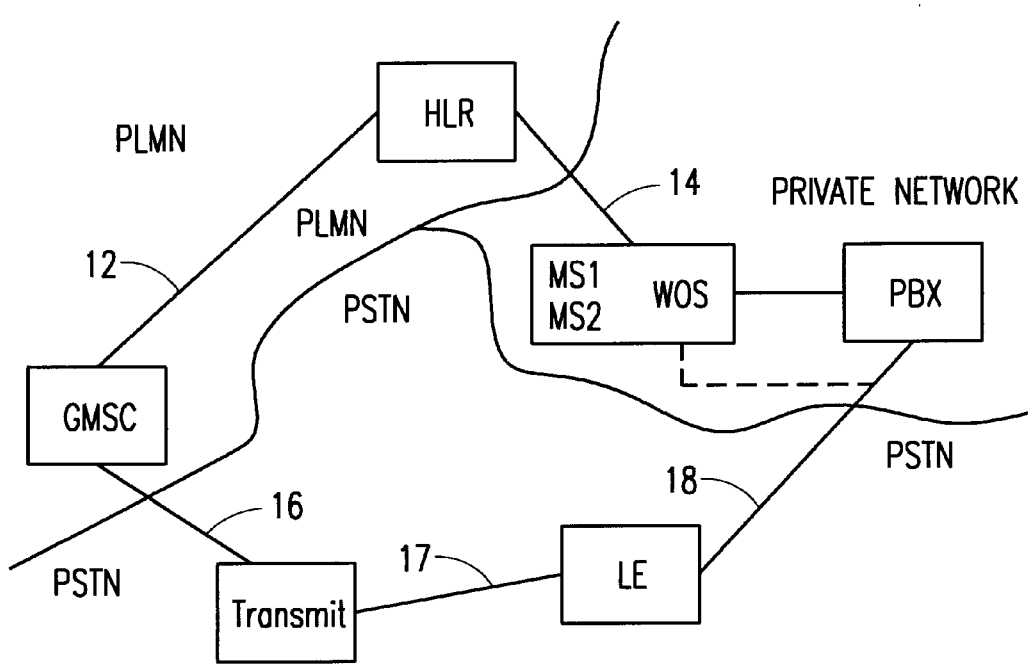
FIG. 1 illustrates a known telecommunications system in which the present invention may be implemented.
Figure 5:
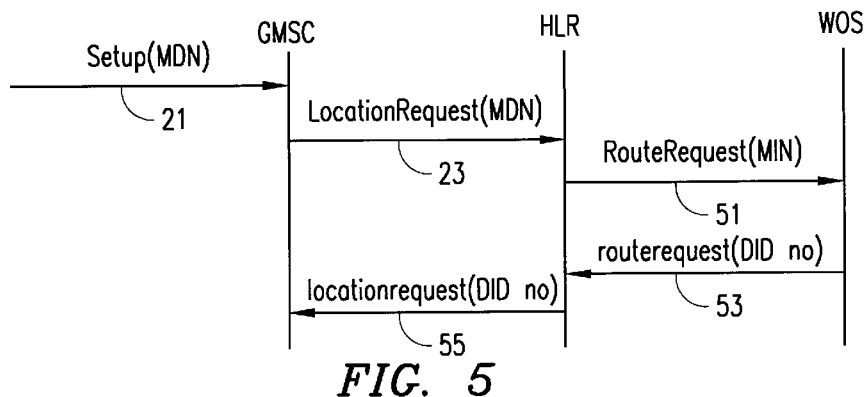
FIG. 5 is a sequence diagram illustrating steps performed to obtain a routing number according to the present invention.
Figure 6:
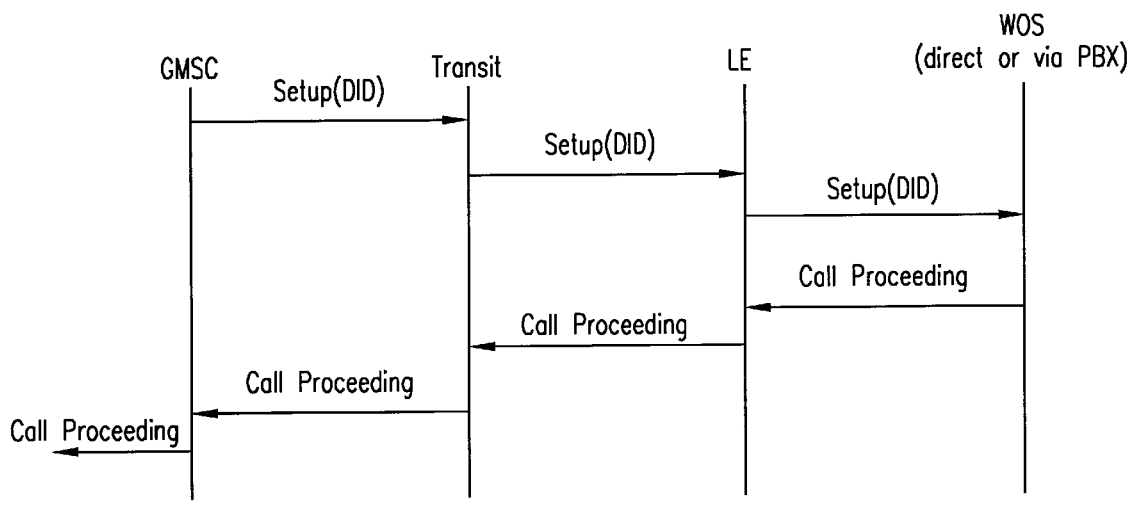
FIG. 6 is a sequence diagram illustrating call routing according to the present invention.

The present invention utilizes the fact that mobile stations registered in private networks such as the WOS of FIG. 1 are each typically assigned a direct in-dialing (DID) number. The DID number can be assigned, for example, by the PSTN operator, and is used to dial the mobile station directly through PSTN without the need to contact an operator or answering service to direct the call to the correct number. As shown in the example of FIG. 5, according to the invention, when the WOS receives from HLR a routing request 51 including MIN, the WOS responds at 53 by sending back to HLR the DID of the mobile station identified by the MIN, rather than sending the HLR a TLDN. The HLR then relays the DID number to the GMSC at 55. As shown in the example of FIG. 6, the GMSC then uses the DID number to route the call through the PSTN to the WOS.

Figure 2:
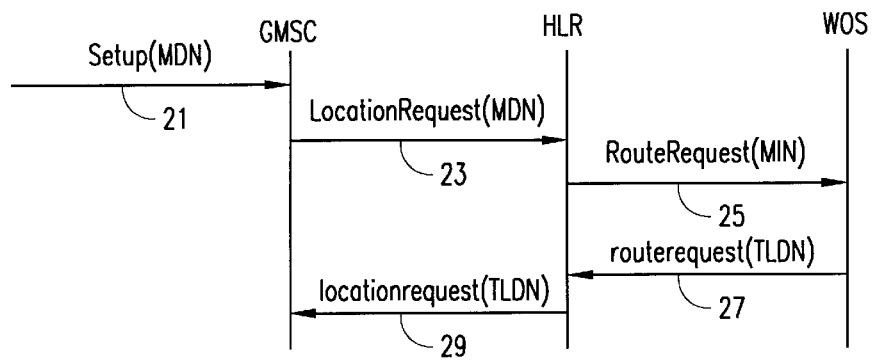
FIG. 2 is a sequence diagram illustrating steps performed to obtain a temporary routing number in the system of FIG. 1.
Figure 3:
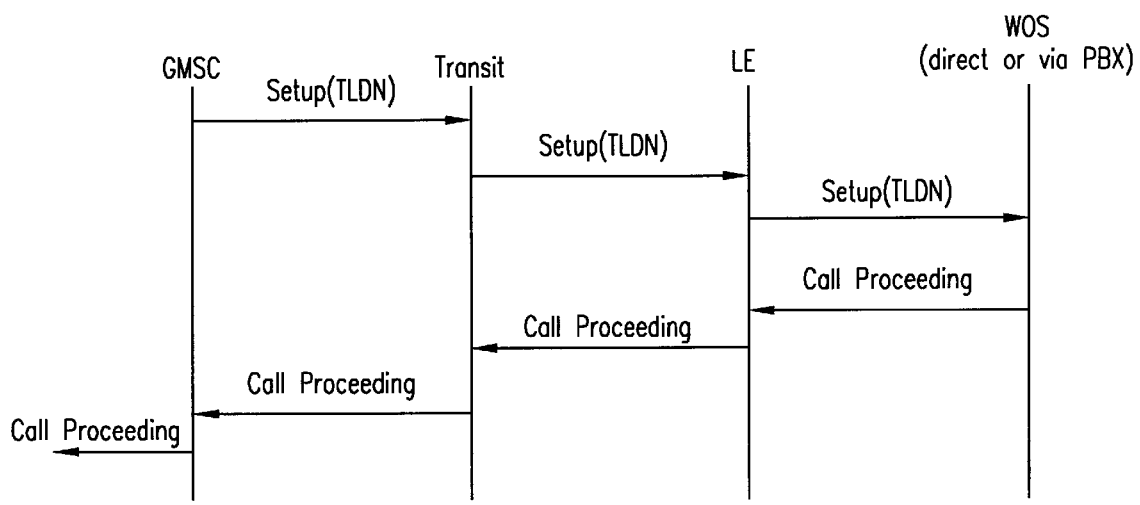
FIG. 3 is a sequence diagram illustrating a call routing procedure executed in the system of FIG. 1.
Figure 4:
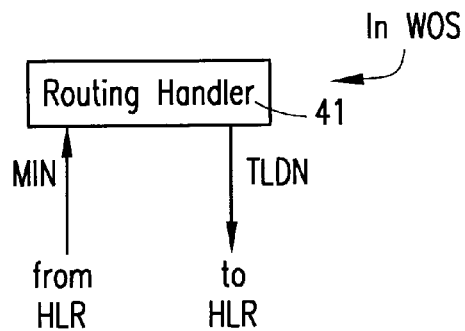
FIG. 4 illustrates a conventional routing handler of the conventional wireless office system of FIG. 1.
Figure 7:
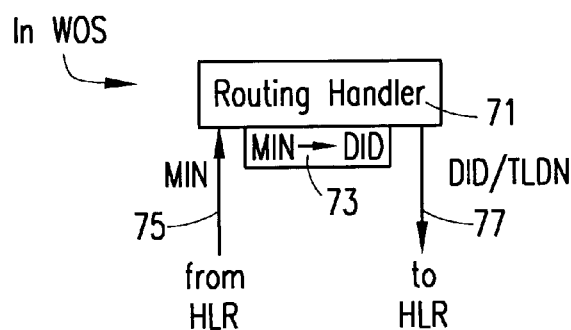
FIG. 7 illustrates a routing handler according to the present invention for use in a wireless office system.

FIG. 7 illustrates an exemplary routing handler 71 which can, according to the invention, be implemented in the WOS of FIG. 1 to provide the DID number to HLR in response to receiving the MIN in the routing request from HLR. The routing handler 71 includes a MIN-to-DID converter 73 coupled between the input 75 thereof and the output 77 thereof. FIG. 7 also indicates that the routing handler 71 may provide a TLDN to HLR in the event that a DID number does not exist for a particular mobile station registered in the WOS. In such cases, the call is set up and routed as shown in FIGS. 2 and 3.

Figure 8:
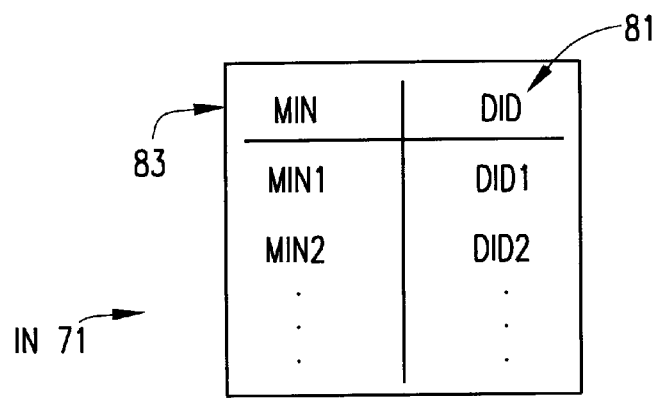
FIG. 8 illustrates in more detail a portion of the converter of FIG. 7.

FIG. 8 illustrates an example of how the MIN-to-DID converter 73 can map MINs into DID numbers, namely a lookup table 81 stored in a suitable memory apparatus 83 in the converter 73. In the lookup table, the DID numbers DID1, DID2, etc. assigned to the mobile stations by the PSTN operator are indexed against the MINs that identify the respective mobile stations. As one example, if the MIN received from HLR is MIN2, then the lookup table of FIG. 8 indicates that the mobile station identified by the mobile identification number MIN2 (e.g., mobile station MS2 of FIG. 1) has a corresponding DID number of DID2. Thus, DID2 would be returned to HLR in response to the MIN2 routing request. The lookup table is easily updated as new DID numbers are assigned to new mobile stations in the WOS.

Because nearly all mobile stations registered in the WOS can be expected to have assigned thereto a DID number, the routing handler 71 of FIG. 7 will rarely need to access a TLDN pool and output a TLDN in response to a routing request from HLR. Therefore, requests for the PSTN operator to issue a new TLDN will be even more rare. Thus, issuance of new TLDNs by the PSTN operator will be significantly less frequent than in the prior art, and the PSTN operator's charges for the new TLDNs will be incurred much less frequently than in the prior art.

Figure 9:
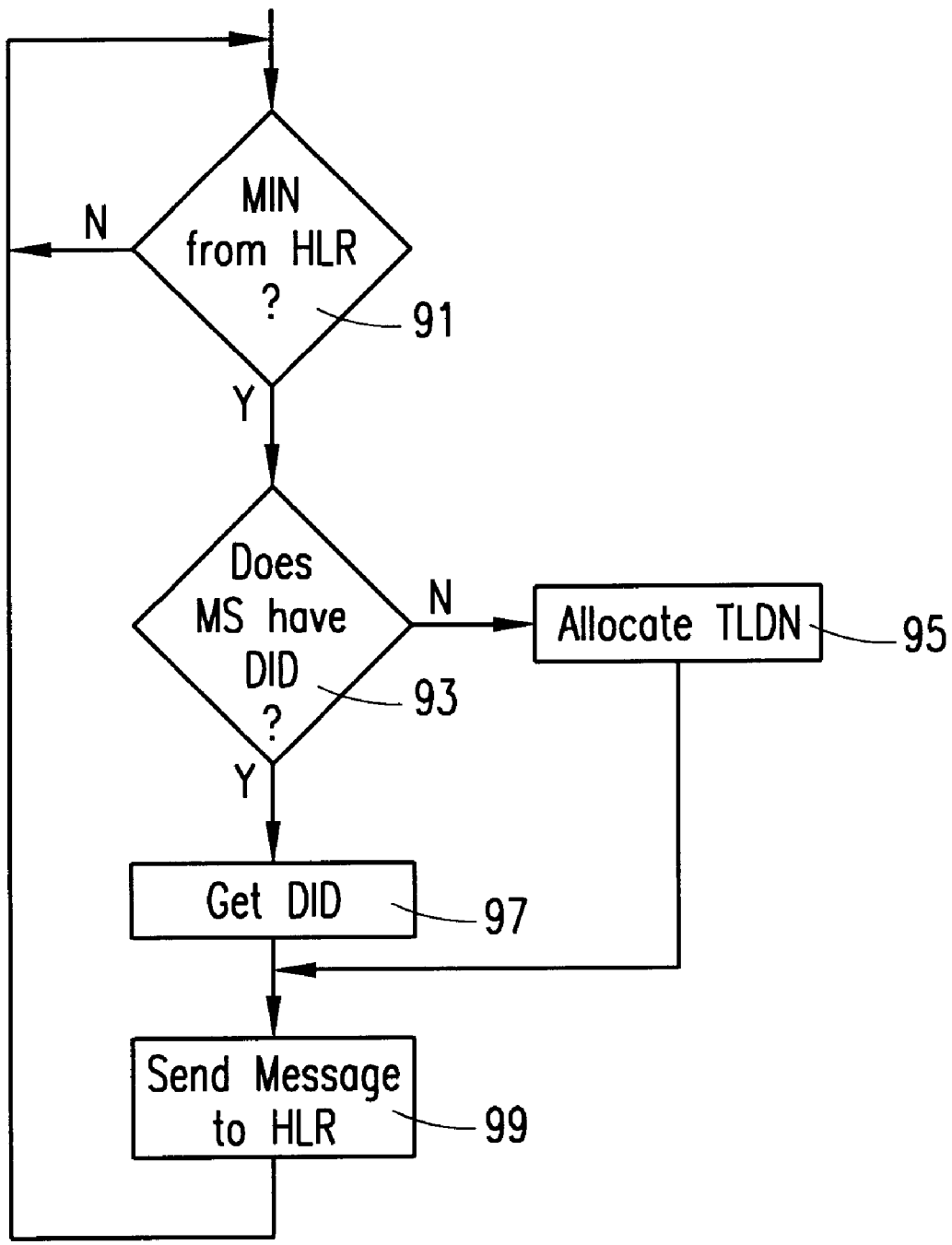
FIG. 9 is a flow diagram illustrating exemplary operations of the routing handler of FIG. 7.

FIG. 9 illustrates exemplary operations of the routing handler 71 of FIG. 7. When a routing request with MIN is received at 91, it is thereafter determined at 93 whether the mobile station identified by the MIN has a DID number assigned thereto. If not, then at 95, the routing handler 71 obtains in conventional fashion a TLDN to be used in routing the call. Thereafter at 99, the routing handler 71 sends to the HLR a message including the TLDN.

If the mobile station identified by the MIN has a DID number already assigned thereto, then at 97 the routing handler 71 maps the MIN into a DID number (e.g., obtains the DID number from the memory table of FIG. 8), and thereafter at 99 sends a message to HLR including the DID number. After the message is sent at 99, the next routing request/MIN is awaited at 91.

It can be seen from the foregoing description that the present invention greatly simplifies the operation of the routing handling function in a Wireless Office System or other private network arrangement whose registered mobile stations already have DID numbers assigned thereto. The routing handling function of the present invention provides, in response to a request for a temporary routing number, a direct in-dialing number that has already been assigned previously to that mobile station by, for example, the PSTN operator.

It will be evident to workers in the art that the embodiments of FIGS. 4–9 can be readily implemented in software, hardware, or a combination of software and hardware, in a suitable data processing circuit portion of the routing handler of a prior art WOS or VMSC.

Although exemplary embodiments of the present invention have been described above in detail, this does not limit the scope of the invention, which can be practiced in a variety of embodiments.

What is claimed is:

1. A method of obtaining a call routing number for a mobile station operating in a first wireless telecommunication system, comprising:

receiving a request to provide a temporary routing number for use in routing a call from outside said first wireless telecommunication system to the mobile station, when said station is located within said first wireless telecommunication system; and providing in response to the request instead of a temporary routing number, a routing number that had already been assigned to the mobile station when the request was received.

2. The method of claim 1, wherein said receiving step includes receiving the request in a private wireless network portion of the wireless telecommunication system in which private wireless network portion the mobile station is located, and receiving the request from a public wireless network portion of the wireless telecommunication system.

3. The method of claim 2, wherein said receiving step includes receiving the request from a home location register of the private wireless network portion.

4. The method of claim 2, wherein the already-assigned routing number is a direct in-dialing number used for direct dialing from a public switched telephone network to the mobile station in the private wireless network portion.

5. The method of claim 2, wherein the request includes identification information that uniquely identifies the mobile station, and wherein said providing step includes mapping said identification information into the already-assigned routing number.

6. The method of claim 5, wherein said mapping step includes using the identification information to select the already-assigned routing number from a list including a plurality of routing numbers already respectively assigned to a plurality of mobile stations located in the private network portion of the wireless telecommunication system.

7. The method of claim 6, wherein the already-assigned routing numbers are direct in-dialing numbers used for direct dialing from a public switched telephone network to the respective mobile stations in the private network portion.

8. The method of claim 2, wherein said receiving step includes receiving the request in a wireless office system of the private network portion.

9. The method of claim 2, wherein the already-assigned routing number is a direct in-dialing number used for direct dialing from a public switched telephone network to the mobile station in the private network portion, and including using the direct in-dialing number to route the call from the pubic network portion of the wireless telecommunication system through the public switched telephone network to the private network portion of the wireless telecommunication system.

10. The method of claim 2, wherein said receiving step includes receiving the request according to one of an IS-41 protocol and a MAP protocol.

11. The method of claim 2, wherein said public network portion is a cellular network, and wherein said private network portion is a cellular network.

12. An apparatus for providing a call routing number for a mobile station operating in a first wireless telecommunication system, comprising:

an input for receiving a request to provide a temporary routing number for use in routing a call from outside said first wireless telecommunication system to the mobile station, when said station is located within said first wireless telecommunication system; and an output coupled to said input and responsive to the request received at said input for providing instead of a temporary routing number, a routing number that had already been assigned to the mobile station when the request was received.

13. The apparatus of claim 12, wherein said input is for receiving said request from a public network portion of said wireless telecommunication system in a private network portion of said wireless telecommunication system in which private network portion is located said mobile station.

14. The apparatus of claim 13, wherein said input is for receiving said request from a home location register of the public network portion.

15. The apparatus of claim 13, wherein said already-assigned routing number is a direct in-dialing number used for direct dialing from a public switched telephone network to the mobile station in the private network portion.

16. The apparatus of claim 13, wherein said request includes identification information that uniquely identifies the mobile station, and including a converter coupled between said input and said output for mapping said identification information into said already-assigned routing number.

17. The apparatus of claim 16, wherein said converter includes a memory having stored therein a lookup table, said converter for using said identification information to select the already-identified routing number from said lookup table in said memory, said lookup table including a plurality of routing numbers already respectively assigned to a plurality of mobile stations located in the private network portion of the wireless telecommunication system.

18. The apparatus of claim 17, wherein said already-assigned routing numbers are direct in-dialing numbers used for direct dialing from a public switched telephone network to the respective mobile stations in the private network portion of the wireless telecommunication system.

19. The apparatus of claim 13, wherein said apparatus forms a portion of a wireless office system in the private network portion.

20. The apparatus of claim 13, wherein said input is for receiving said request according to IS-41 protocol and said output is for providing said routing number according to IS-41 protocol.

21. The apparatus of claim 13, wherein said input is for receiving said request according to MAP protocol and said output is for providing said routing number according to MAP protocol.

22. The apparatus of claim 13, wherein the public network portion is a cellular network, and wherein the private network portion is a cellular network.

23. A private cellular telecommunication network, comprising:

a mobile station for receiving calls from outside a coverage area of said private cellular network; and an apparatus for providing a call routing number for said mobile station, including an input for receiving from outside said coverage area a request to provide a temporary routing number for use in routing a call from outside said coverage area to said mobile station within said coverage area, and an output coupled to said input and responsive to said request received at said input for providing instead of a temporary routing number, a routing number that had already been assigned to said mobile station when said request was received when said mobile station is located within said private telecommunication network and when said request originates from outside said private telecommunication network.

24. The network of claim 23, including a wireless office system, wherein said coverage area is associated with said wireless office system, and wherein said mobile station is accessible to receive calls from outside of said coverage area of said wireless office system.

* * * * *